US008632085B2

(12) United States Patent
Davenport et al.

(10) Patent No.: US 8,632,085 B2
(45) Date of Patent: Jan. 21, 2014

(54) BOLTED I-BEAM AXLE SUSPENSION SYSTEM AND METHOD OF CONSTRUCTION

(75) Inventors: Dean Davenport, Ingersoll (CA); Philip David Schnurr, Ilderton (CA); Neil Kenneth Haslam, Hamilton (CA)

(73) Assignee: IMT Partnership, Ingersoll (CA)

( * ) Notice: Subject to any disclaimer, the term of this patent is extended or adjusted under 35 U.S.C. 154(b) by 0 days.

(21) Appl. No.: 13/601,716

(22) Filed: Aug. 31, 2012

(65) Prior Publication Data
US 2013/0056946 A1 Mar. 7, 2013

(51) Int. Cl.
*B60G 9/02* (2006.01)
*B60G 7/00* (2006.01)
(52) U.S. Cl.
USPC .............................. 280/124.116; 280/124.128
(58) Field of Classification Search
CPC .............. B60G 3/14; B60G 3/22; B60G 7/00; B60G 7/001; B60G 7/008
USPC ......... 280/124.1, 124.116, 124.128, 124.153, 280/124.156; 301/124.1, 125; 403/110, 403/195, 234, 335–338, 373
See application file for complete search history.

(56) References Cited

U.S. PATENT DOCUMENTS

| 4,310,171 | A  | * | 1/1982  | Merkle ...................... 280/86.75 |
| RE32,774  | E  | * | 11/1988 | Duff ......................... 280/86.751 |
| 5,366,237 | A  | * | 11/1994 | Dilling et al. .......... 280/124.116 |
| 6,241,266 | B1 | * | 6/2001  | Smith et al. ............ 280/124.116 |
| 6,557,875 | B2 | * | 5/2003  | Schlosser et al. ....... 280/124.153 |
| 7,007,960 | B2 | * | 3/2006  | Chalin et al. ........... 280/124.116 |
| 7,175,190 | B2 | * | 2/2007  | Reineck .................... 280/124.17 |
| 7,669,866 | B2 | * | 3/2010  | Peaker et al. .......... 280/124.128 |
| 7,690,660 | B2 | * | 4/2010  | Dudding et al. ....... 280/124.116 |
| 7,726,673 | B2 | * | 6/2010  | Saieg et al. ............ 280/124.128 |
| 7,900,942 | B2 | * | 3/2011  | Koschinat .............. 280/124.111 |
| 7,954,833 | B1 | * | 6/2011  | Heath et al. ............ 280/124.116 |
| 8,038,163 | B2 | * | 10/2011 | Dudding et al. ....... 280/124.128 |
| 8,136,825 | B2 | * | 3/2012  | Luna ....................... 280/124.175 |
| 2008/0238015 | A1 | * | 10/2008 | Duddling et al. ...... 280/124.116 |
| 2010/0044991 | A1 | * | 2/2010  | Luna ....................... 280/124.175 |

\* cited by examiner

*Primary Examiner* — Joseph Rocca
(74) *Attorney, Agent, or Firm* — Daryl W. Schnurr

(57) ABSTRACT

A suspension axle has beams that are bolted onto the axle. There are plates that are rigidly affixed to the front and rear of the axle with indentations on the inner end of the main portions and secondary portions of the beams that are sized to fit tightly over the plates. Bolts extend through openings in the axle end of the main portion and secondary portion and also through the plates and through the axle. The bolts have nuts thereon to securely hold the main portion and secondary portion in contact with the axle.

8 Claims, 5 Drawing Sheets

BOLTED I-BEAM AXLE SUSPENSION SYSTEM AND METHOD OF CONSTRUCTION

BACKGROUND OF THE INVENTION

1. Field of the Invention

This invention relates to axle suspension systems for wheeled vehicles and to a method of construction of axle suspension systems. More particularly, this invention relates to an axle suspension system having beams that are bolted onto the axle.

2. Description of the Prior Art

Axle suspension systems are known. One such system is described in the Dilling et al U.S. Pat. No. 5,366,237. Each beam has a pair of side walls extending in substantially the vertical direction with respect to the vehicle with an orifice in each sidewall through which the axle extends and is rigidly attached thereto. To install the axle suspension system on an axle, the beams must be placed over a free end of the axle and slid longitudinally along the axle to the appropriate location with the axle extending through the orifices in the two sides walls of each beam.

SUMMARY OP THE INVENTION

It is an object of the present invention to provide an axle bearing suspension system in which the beams are bolted onto the axle and the axle has openings therein to receive the bolts for the beams. It is a further object of the present invention to provide an axle bearing suspension system in which each of the beams has a main portion installed on one side of the axle between a hanger bracket and the axle and a secondary portion installed on an opposite side of the axle to support pneumatic bellows. It is still a further object to provide beams that can be installed laterally on the axle.

An axle bearing suspension system for an axle of a wheeled vehicle comprises a pair of elongated beams, one of the beams being located adjacent to each side of the vehicle, the beams being spaced from one another. The axle extends across an entire width of the vehicle, the axle having at least one wheel located on each end thereof. A pneumatic bellow is located on each of the beams, a hanger bracket being located on one end of each beam for connecting the axle to a frame of the vehicle. Each beam has a main portion and a secondary portion. The axle has a plurality of first openings at either side thereof, the first openings being located at a front and rear of the axle. The first openings at the front of the axle are in alignment with the first openings at the rear of the axle. The first openings on one side of the axle at a front of the axle are a first set, the first openings on the same side of the axle at the rear of the axle being a second set. The first openings on an opposite side of the axle at the front of the axle are a third set and the first openings at the opposite side of the axle at the rear of the axle are a fourth set. There are a plurality of plates that are shaped to conform to the shape of an outer surface of the axle. Each plate has second openings therein, the second openings corresponding to the first openings in each set and the plates being fixed to the axle at the location of each set of openings so that the second openings of each plate are aligned with the first openings of each set. The plates protrude outward from the outer surface of the axle and are affixed to the axle. The main portion and secondary portion of each beam have an indentation located at an inner end thereof where the portions connect to the axle, the indentation being sized to fit tightly over the plate. An axle end of the main portion and secondary portion of each beam has third openings therein, the third openings corresponding to the first and second openings, with bolts to extend through the first openings, second openings and third openings for each location with nuts to affix each beam securely to the axle.

Preferably, the plates have a tube extending into the axle for each opening, the tubes being sized to support the bolts.

A method of constructing an axle bearing suspension system for an axle of a wheeled vehicle in which the axle has a pair of elongated beams, one of the beams being located adjacent to each side of the vehicle. The beams are spaced from one another and the axle extends across an entire width of the vehicle. The axle has at least one wheel located on each end thereof. A pneumatic bellows is located on each of the beams, a hanger bracket being located on one end of each beam for connecting the axle to a frame of the vehicle. The method comprises fabricating a main portion and secondary portion of each beam each of the main and secondary portions having respective openings at the axle ends thereof, fabricating pates with corresponding openings therein and tubes extending from the openings, locating further corresponding openings in a front and rear of the axle to receive the tubes of the plates, inserting the tubes into the axle openings and affixing the plate to the axle, locating indentations at the respective axle ends of the main portion and the secondary portion of each beam, sizing the indentations to tightly fit over the plates, aligning the openings of a main portion and secondary portion with the plate openings and the axle openings at the front and rear of the axle, inserting bolts through the aligned openings and installing nuts on the bolts to securely hold the main portion and secondary portion of each beam against the axle with each plate being located in a corresponding indentation, and installing additional components of the beams and the axle.

DETAILED DESCRIPTION OF A PREFERRED EMBODIMENT

Figure 1:
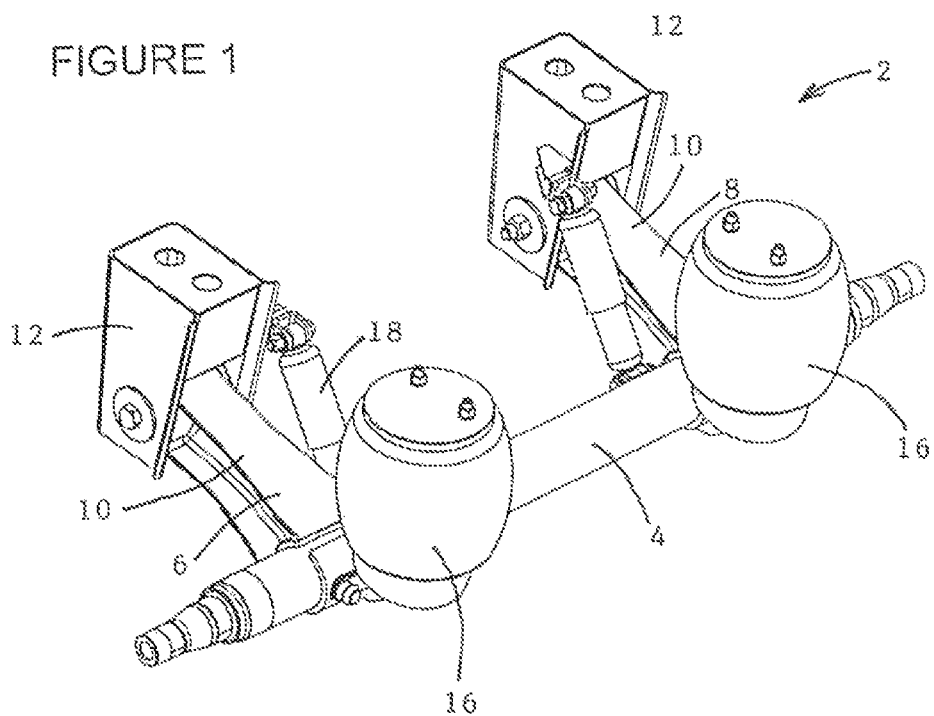
FIG. 1 is a perspective view of a suspension axle.
Figure 2:
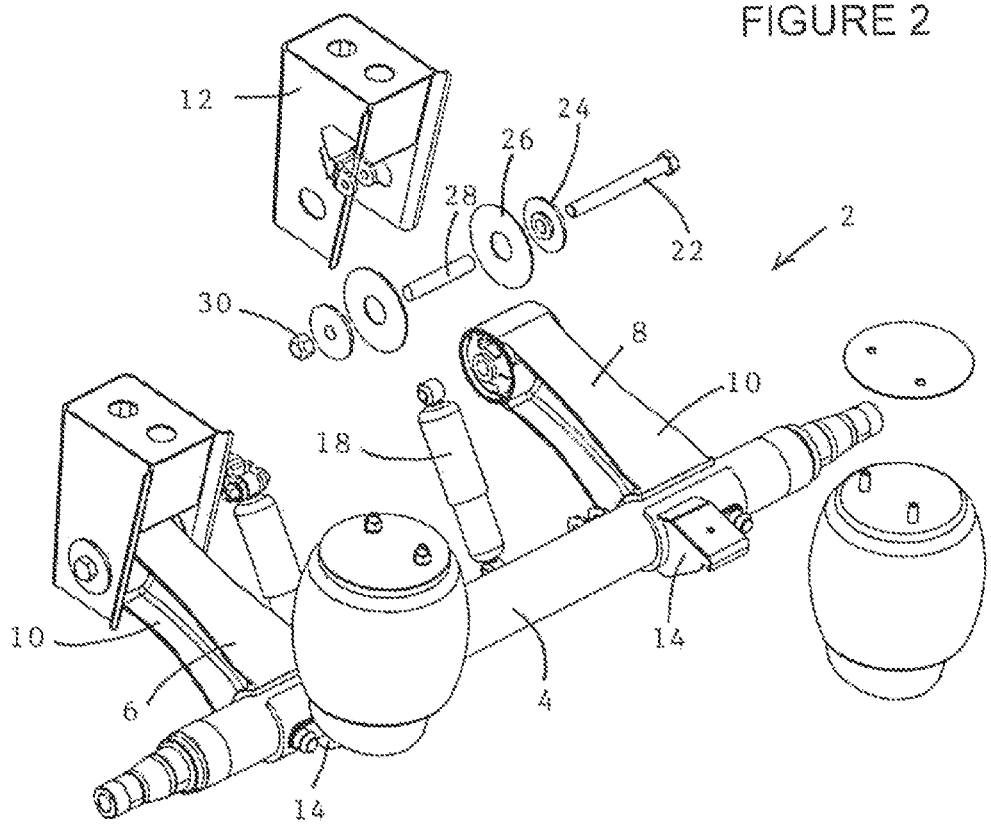
FIG. 2 is a partially exploded perspective view of a suspension axle.
Figure 3:
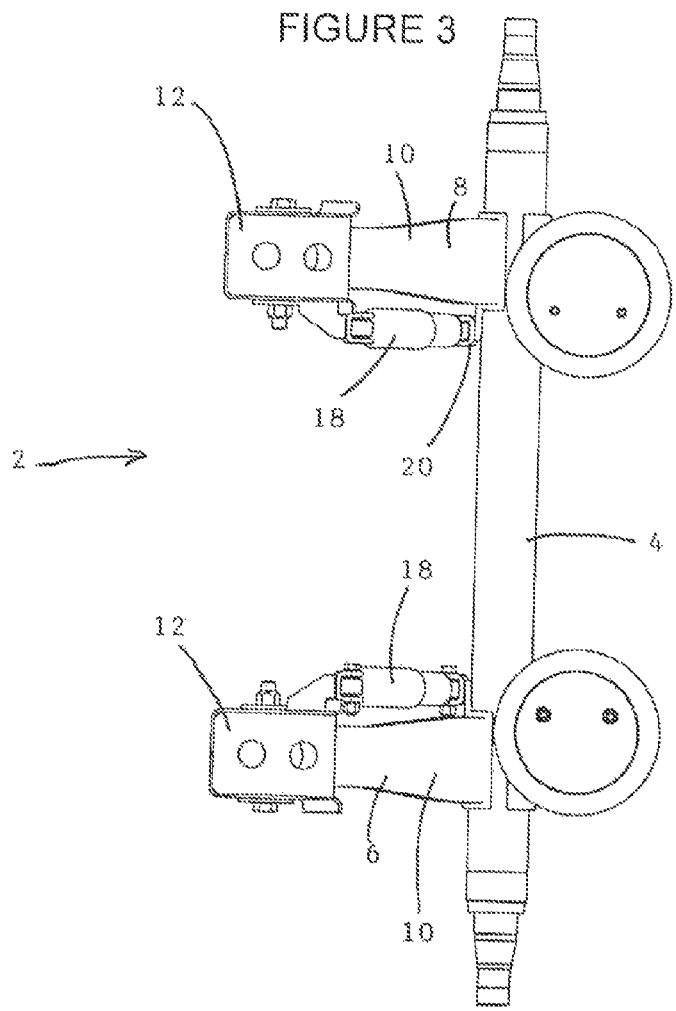
FIG. 3 is a top view of a suspension axle.
Figure 4:
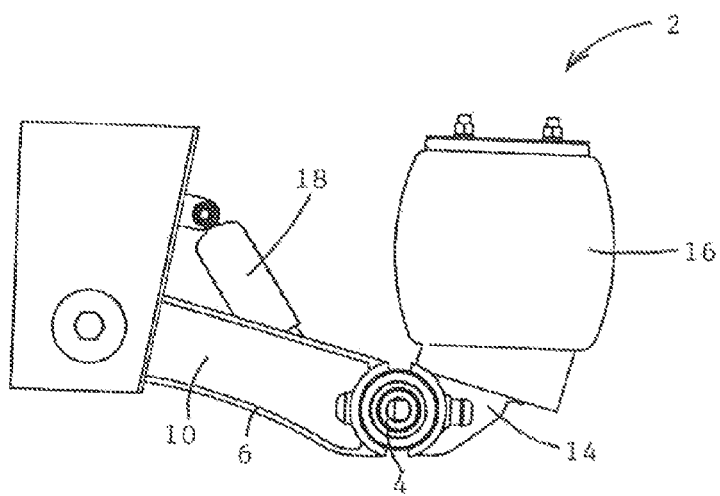
FIG. 4 is a side view of a suspension axle.
Figure 5:
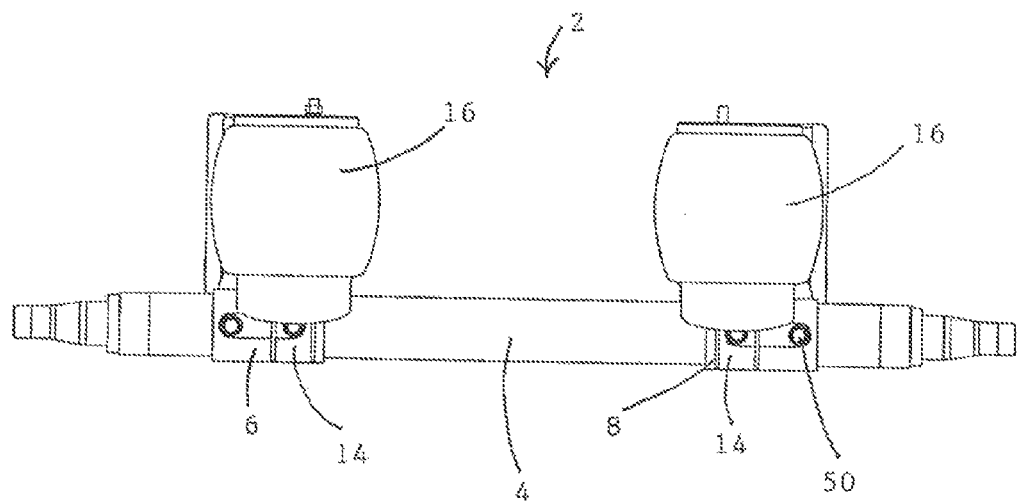
FIG. 5 is a rear view of a suspension axle.

In FIGS. 1 to 5, an axle bearing suspension system 2 has an axle 4 with a pair of elongated beams 6, 8 affixed thereto. The beams 6, 8 are located adjacent to each side of the vehicle (not shown) and are spaced apart from one another. Each beam 6, 8 has a main portion 10 extending between a hanger bracket 12 and the axle 4. A secondary portion 14 of each beam 6, 8 provides support for pneumatic bellows 16 at a rear of the axle 4. Pneumatic cylinders 18 are mounted between the hanger brackets 12 and brackets 20 on the axle end of the main portion 10. In FIG. 2, it can be seen that there is a bolt 22, washers 24, 26, a sleeve 28, and a nut 30 to affix the hanger bracket end of the beams 6, 8 to the hanger bracket 12. It can be seen that the main portion 10 and secondary portion 14 of the beam 8 are located separate and apart from one another.

Figure 6:
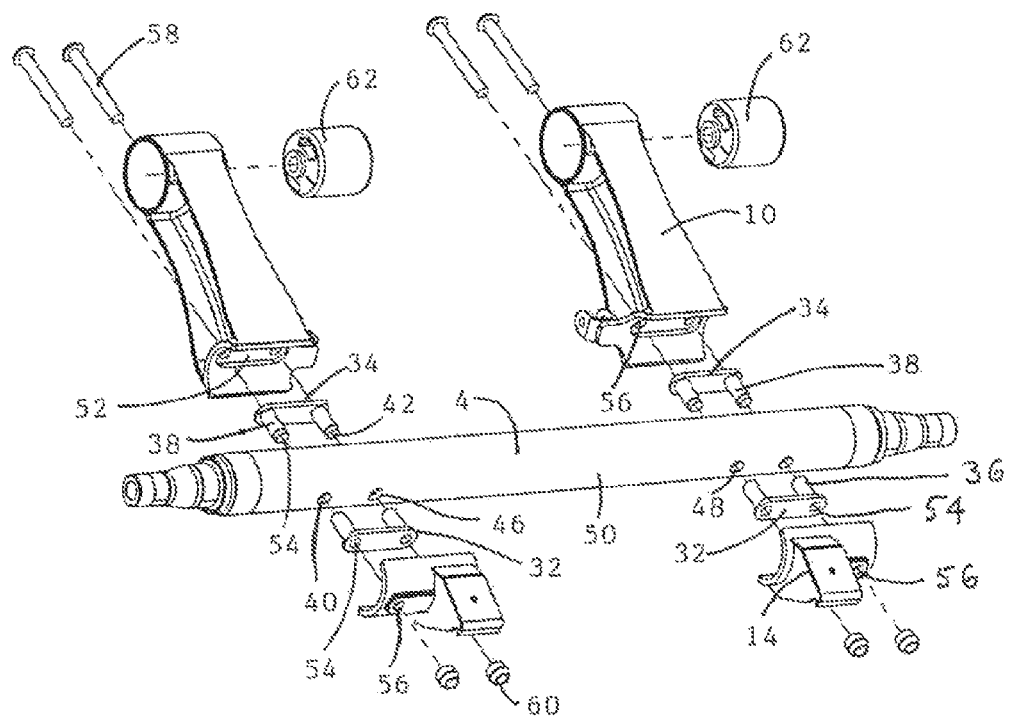
FIG. 6 is an exploded perspective view of the axle having two beams.
Figure 7:
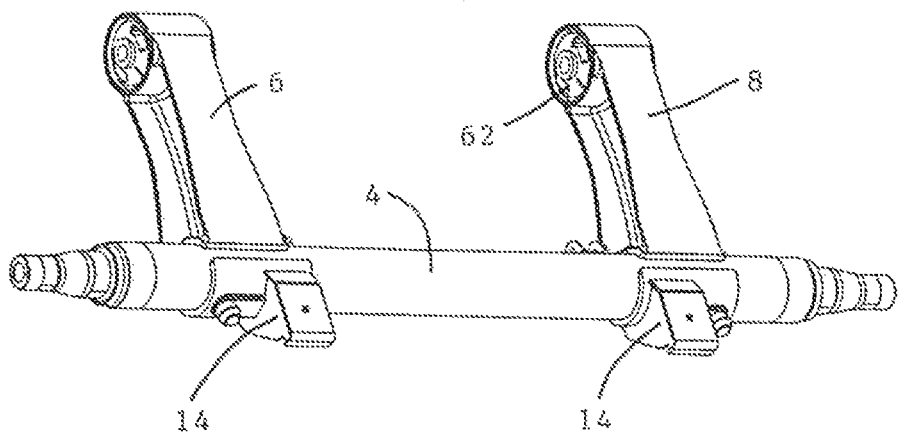
FIG. 7 is a perspective view of an axle with two beams affixed thereto.
Figure 8:
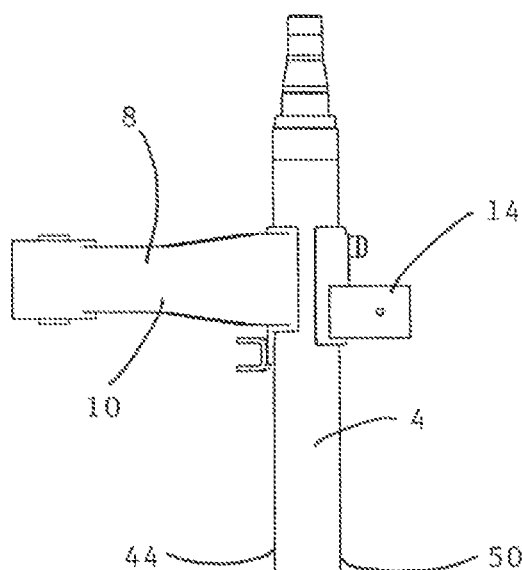
FIG. 8 is a top view of the axle with two beams affixed thereto.
Figure 8:
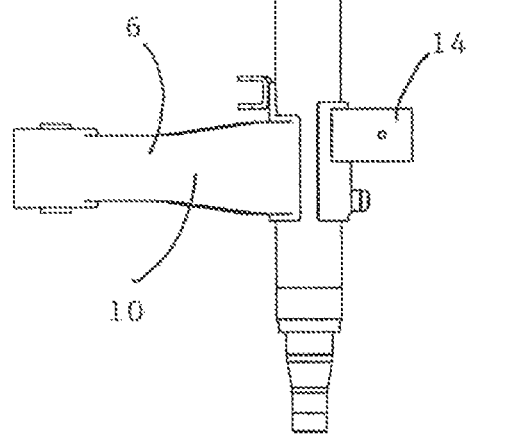
Figure 9:
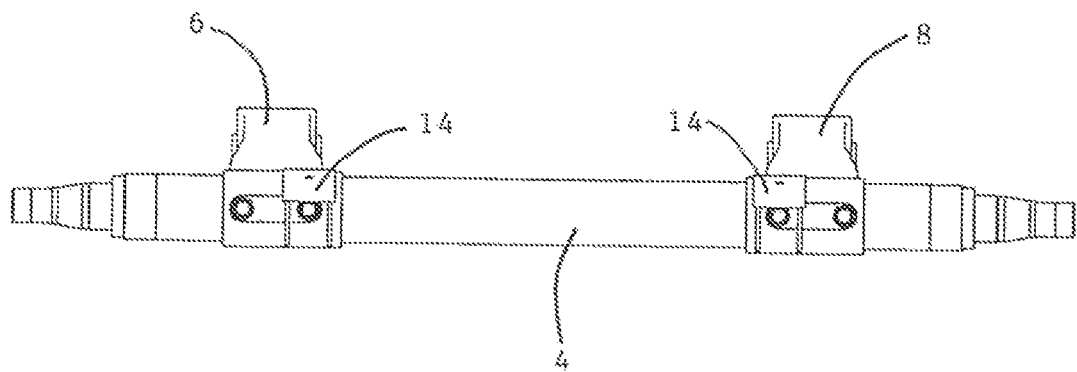
FIG. 9 is a rear view of the axle.
Figure 10:
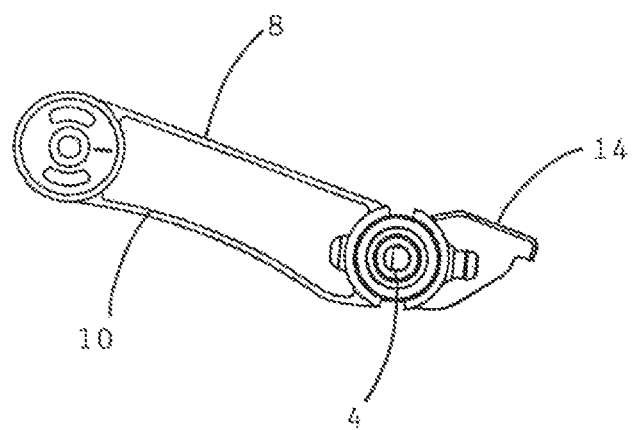
FIG. 10 is a side view of a beam and an end view of the axle.

In FIGS. 6 to 10, it can be seen that plates 32, 34, have tubes 36, 38 respectively extending inward therefrom through first openings 40 in the axle 4. The tubes 36 are recessed at a free end 42 thereof to fit within the tubes 36 when the tubes are inserted into the axle 4. There are four sets of first openings 40 in the axle 4, being a first set and a second set. The first and second sets of the first openings 40 are on a front 44 of the axle 4 and are not shown in the drawings. The third set 46 and fourth set 48 are located on the rear 50 of the axle and are shown in FIG. 6. The main portion 10 of the beams 6, 8 has an indentation 52 that is sized to fit tightly over the plates 34. The secondary portions 14 of the beams 6, 8, which are extension pedestals to support the bellows (not shown in FIGS. 6 to 10), also have an indentation (not shown) to fit tightly over the plates 32. The plates 32, 34 have second openings 54 therein. Third openings 56 are located at the inner end of the main portion 10 and the inner end of the secondary portion 14 of the beam 6, 8. The first openings 40, second openings 54 and third openings 56 correspond to one another so that bolts 58 can be inserted through the openings 40, 54, 56 and through the tubes 36, 38. The bolts are threaded and are tightened with nuts 60, there being two bolts and corresponding nuts for each beam 6, 8. Cylindrical inserts 54 at a hanger end of the beams 6, 8 allow the beams to pivot relative to the frame (not shown) of the vehicle (not shown). The indentation has a corresponding size to the plate with which it is used so that the indentation fits slightly over the plate. A depth of the indentation is slightly larger than the thickness of the plate that the indentation covers.

The inner ends of the main portions 10 and secondary portions 14 are shown in the drawings to be arcuate to conform with the curvature of the outer surface of the axle 4. The axle 4 can have various cross sectional shapes other than circular including oval, rectangular and square. Also, the axle 4 can be hollow or solid. Preferably, the axle 4 has a circular cross section and is hollow.

The plates 32, 34 are rigidly affixed to the axle 4 preferably by welding, but the plates can be affixed to the axle 4 by other means including adhesives or the tubes can be press fitted into the first openings 40 to affix the plates 32, 34 to the axle 4. The plates 32, 34 are shaped to conform to the shape of the outer surface of the axle.

The main portion 10 of the beams 6, 8 can be welded, forged or cast. Preferably, the main portion has an I-shaped cross section with a web 64 in the centre and flanges 66, 68 affixed thereto. The main portion 10 and the secondary portion 14 can be welded, forged or cast. The bracket 20 is affixed to the inner end of the main portion 10.

To construct the suspension system 2, the tubes 36, 38 of the plates 32, 34 respectively are inserted into the first openings 40 and the plates 32, 34 are rigidly affixed to the axle 4. The main portions 10 and secondary portions 14 are then placed on the plates 34, 32 respectively with the plates being inserted into the indentations 52. The bolts 58 are then inserted through the openings 40, 54, 56 and the nuts 60 are threaded onto the bolts and tightened. The hanger brackets 12, bellows 16 and pneumatic cylinders 18 are then installed as shown in FIGS. 1 to 5.

An advantage of the present invention is that repairs can be made in the field or at the location of a customer or user using replacement parts, rather than having to obtain a replacement suspension system from the manufacturer. The location of the plates 32, 34 and the indentations 62 ensures the proper orientation of the beams 6, 8 on the axle 4. The requirement that the plates 32, 34 be tightly inserted into the indentations 52 ensures that the main portions 10 or secondary portions 14 will not pivot relative to the axle 4.

We claim:

1. An axle bearing suspension system for an axle of a wheeled vehicle comprises:
   (i) a pair of elongated beams, one of the beams being located adjacent to each side of the vehicle, the beams being spaced apart from one another, the axle extending across an entire width of the vehicle, the axle having at least one wheel located on each end thereof;
   (ii) a pneumatic bellows being located on each of the beams, a hanger bracket being located on one end of each beam for connecting the axle to a frame of the vehicle, each beam having a main portion and a secondary portion;
   (iii) the axle having a plurality of first openings on either site thereof, the first openings being located at a front and rear of the axle, the first openings at the front of the axle being in alignment with the first openings at the rear of the axle, the first openings on one side of the axle at a front of the axle being a first set, the first openings on the same side of the axle at the rear of the axle being a second set, the first openings on an opposite side of the axle at the front of the axle being a third set and the first openings at the opposite side of the axle at the rear of the axle being a fourth set;
   (iv) there being a plurality of plates that are shaped to conform to the shape of an outer surface of the axle, each plate has second openings therein, the second openings corresponding to the first openings in each set and the plates being fixed to the axle at the location of each set of openings so that the second openings of each plate are aligned with the first openings of each set, the plates protruding outward from the outer surface of the axle and being affixed to the axle;
   (v) the main portion and secondary portion of each beam each having an indentation located at an inner end thereof where the portions connect to the axle, the indentation being sized to fit tightly over one of the respective plates;
   (vi) an axle end of the main portion and secondary portion of each beam having third openings therein, the third openings corresponding to the first and second openings, with bolts to extend through the first openings, second openings and third openings for each location with nuts to affix each beam securely to the axle.

2. An axle bearing suspension system as claimed in claim 1 wherein there are tubes extending from the openings in the plates, the tubes extending at least partially from the plates into the corresponding openings in a front or rear of the axle.

3. An axle bearing suspension system as claimed in claim 2 wherein the tubes are inserted into the axle openings during assembly of the beams on the axle.

4. An axle bearing suspension system as claimed in claim 1 wherein the main portion and the secondary portion of each beam are separate components and are installed on opposite sides of the axle, the main portion and the secondary portion being installed to the axle by bolts that extend through the respective openings.

5. A method of constructing an axle bearing suspension system for an axle of a wheeled vehicle in which the axle has a pair of elongated beams, one of the beams being located adjacent to each side of the vehicle, the beams being spaced from one another and the axle extending across an entire width of the vehicle, the axle having at least one wheel located on each end thereof, a pneumatic bellows being located on each of the beams, a hanger bracket being located on one end of each beam for connecting the axle to a frame of the vehicle, the method comprising:

(i) fabricating a main portion and secondary portion of each beam each of the main and secondary portions having respective openings at the respective axle ends thereof, fabricating plates with corresponding openings therein;
(ii) locating further corresponding openings in a front and rear of the axle, and affixing the plate to the axle;
(iii) locating indentations at the respective axle ends of the main portion and the secondary portion of each beam, sizing the respective indentations to tightly fit over the plates;
(iv) aligning the openings of a main portion and secondary portion with the plate openings and the axle openings at the front and rear of the axle;
(v) inserting bolts through the aligned openings and installing nuts on the bolts to securely hold the main portion and secondary portion of each beam against the axle with each plate being located in a corresponding indentation, and installing additional components of the beams and the axle.

6. A method of constructing an axle bearing suspension system as claimed in claim 5 including the steps of fabricating the plates with tubes extending from the openings and inserting the tubes into the openings on one side of the axle and slightly out of the openings on an opposite side of the axle.

7. A method of constructing an axle bearing suspension system as claimed in claim 6 wherein the plates are affixed to the axle by inserting the tubes into the openings on one side of the axle and out of the openings on an opposite side of the axle, the plates being held in a fixed position by the bolts and nuts that are used to hold the main portion and secondary portion of the beams in a fixed position on either side of the axle.

8. A method of constructing an axle bearing suspension system as claimed in claim 5 wherein the plates are affixed to either side of the axle with the openings in the plates corresponding to the openings in the axle and welding the plates onto the axle.

* * * * *